PULSE CODE MODULATION SYSTEM

Filed Aug. 30, 1951 3 Sheets-Sheet 1

INVENTORS
David Harker Paul
Christopher Edmund Gervase Bailey
By Fred M Vogel
Agent INVENTORS
David Harker Paul
Christopher Edmund Gervase Bailey
By Fred M. Vogel
Agent INVENTORS
David Harker Paul
Christopher Edmund Gervase Bailey
By Fred M Vogel
Agent United States Patent Office 2,745,064

Patented May 8, 1956

2,745,064

PULSE CODE MODULATION SYSTEM

Christopher Edmund Gervase Bailey, Bromma, Sweden, and David Harker Paul, Loughborough, England, assignors to Hartford National Bank and Trust Company, Hartford, Conn., as trustee Application August 30, 1951, Serial No. 244,428

Claims priority, application Great Britain September 1, 1950

8 Claims. (Cl. 332—11)

This invention relates to pulse code modulation systems.

Coders and decoders for use in pulse code modulation systems are known comprising a cathode ray tube having a coded stencil plate. Such an encoder is proposed in the Bell System Technical Journal, January 1948, pages 30 to 36, which device, in principle, may be used for any binary code. A similar device for decoding, similarly applicable to any binary code, is the subject of U. S. Patent No. 2,569,970 dated October 2, 1951. A disadvantage of such devices is that they would have to be specially and accurately manufactured; and there is indication that they may suffer from trouble with secondary emission. For this and other reasons, circuits are preferable which employ standard tubes. Moreover, especially when pulse code modulation is considered for high signal-to-noise ratio and therefore with a large number of binary digits, i. e. to decrease quantisation noise, those circuits which use a group of components per level are virtually unfeasible and those circuits which use a group of components per binary are at a disadvantage.

A very simple decoder attributed to C. E. Shannon with improvements by A. J. Rack is described in the Bell System Technical Journal, January 1948, pages 36 to 38, which utilises only standard tubes, and in principle is capable of decoding a code of any number of digits. In the Shannon decoder, the value of a digit (0 or 1) is reproduced as the initiation or non-initiation of an exponential falling step wave:

$$H(t)2^{-t/\tau}$$

where $H(t)$ is the Heaviside unit function of time $t$ and $\tau$ is the interval between digits. All these waves are then summed by an integrating network and this sum gives of the decoded level. The limitation of this type of decoder is that it will only decode that code in which successive digits have increasing values. Unfortunately, the only corresponding simple encoder is that which produces exactly the opposite code, namely that in which successive digits have decreasing values.

The object of the present invention is to provide a circuit arrangement for encoding or decoding pulse code modulation by addition for example, of waves of the form $H(t)2^{t/\tau}$, i. e. positive exponential waves. It is, in fact, not necessary that the added functions should be step functions. It is only necessary that $$\int(\text{pulse})f(t)2^{t/\tau}\neq 0$$

According to a first aspect of the invention, a circuit arrangement for use in encoding pulse code modulation signals, is adapted to produce an output signal which, or an output signal the envelope of which is an increasing exponential function of time, the initial level being a function of the input signal or of the envelope thereof.

According to a second aspect of the invention, a circuit arrangement for use in decoding pulse code modulation signals, is adapted to produce an output signal which, or an output signal the envelope of which is an increasing exponential function of time, the final level being a function of the input signal or of the envelope thereof. The input signal will normally be a code element.

The circuit arrangement according to the invention may, as a first alternative, comprise the combination of a negative conductance and a reactive conductance, and means to supply to the combination an input voltage or current and/or means to take from the combination an output voltage current. Thus, a set of successive impulses may be impressed on a circuit whose response to a Heaviside input waveform is a positive exponential. When the input is a current and the response is a potential, this is described in the art by saying that the indicial impedance is a positive exponential. For example, pulses of current may be impressed on the shunt combination of a negative conductance and a capacitance. Other equivalent combinations may be derived, for example, with the substitution of electro-motive force for current, inductance for capacitance, series for shunt.

As a second alternative, the circuit arrangement according to the invention may comprise a super-regenerative amplifier and means to supply thereto a carrier frequency input, the natural frequency of the super-regenerative amplifier being equal to or near the frequency of the carrier frequency input and the carrier being modulated by pulses constituting the pulse code signal to be applied to the input of the super-regenerative amplifier. Thus, radio frequency oscillations modulated by a series of step functions may be impressed on a super-regenerative circuit.

The distinction between said two alternative circuit arrangements is analogous to two methods of direct current amplifications:

(*a*) By normal direct current amplification, and
(*b*) By converting to alternating current, amplifying as alternating current and then detecting.

Method (*b*) suffers from the inherent complication that double conversion is necessary and the frequency discrepancy between the impressed electro-motive force and the natural oscillation of the super-regenerative circuit would have to be examined in any particular case, since the latter is independent of the former and it is essential that the two remain in phase. On the whole, method (*a*) is to be preferred where the total amplification required is not great, regard being had to possible typical drifts caused, for example, by supply variations and tube parameter variations.

The circuit arrangement may comprise a transitron circuit arranged to provide apparent negative conductance over the appropriate voltage range and the output may be taken from across the reactive conductance. The circuit arrangement may comprise two grid-controlled tubes, preferably triodes, one connected in one sense to one electrode of a capacitor constituting the capacitance and the other connected in the opposite sense to the other electrode of the capacitor to re-establish the initial condition of the capacitor at the end of each code element and means to make the two tubes conductive at the end of each code element under the control of pulses to be supplied to the control grids thereof at the end of each code element.

As an alternative, the circuit arrangement may comprise a distable multivibrator containing a single integrating time-constant circuit.

If the circuit arrangement comprises a super-regenerative amplifier, means may be provided to introduce at the end of each code element a quench voltage into the anode circuit of the super-regenerative amplifier tube.

The circuit arrangement may comprise means to compare the signal to be encoded with a comparison level and means to subtract the comparison level from the signal to be encoded if the magnitude of the comparison level is less than the magnitude of the signal to be encoded. Comparison and subtraction may be performed in one operation.

The invention will now be described more fully with reference to the accompanying diagrammatic drawings, given by way of example, in which.

Figure 1:
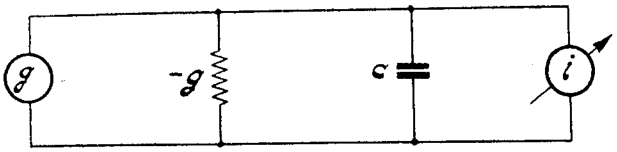
Figure 1 shows a basic circuit arrangement according to the invention.

Referring now to Figure 1, the circuit arrangement comprises a generator *g* of current in the form of code pulses. The generator may take the form of a remote telegraphy transmitter connected by way of land lines, a local wave form generator the function of which is to restore or regenerate waveforms suffering from transmission distortion, a detector of a radio receiver or an amplifier stage subsequent to such a detector. The current in the form of code pulses produced by the generator *g* is impressed on the shunt combination of a negative conductance $-G$ and a capacitance C. The circuit arrangement also comprises an indicator *i* which may be connected to subsequent smoothing circuits, including circuits for removing residual pulse repetition frequency components, as are known in the art.

Figures 2, 3:
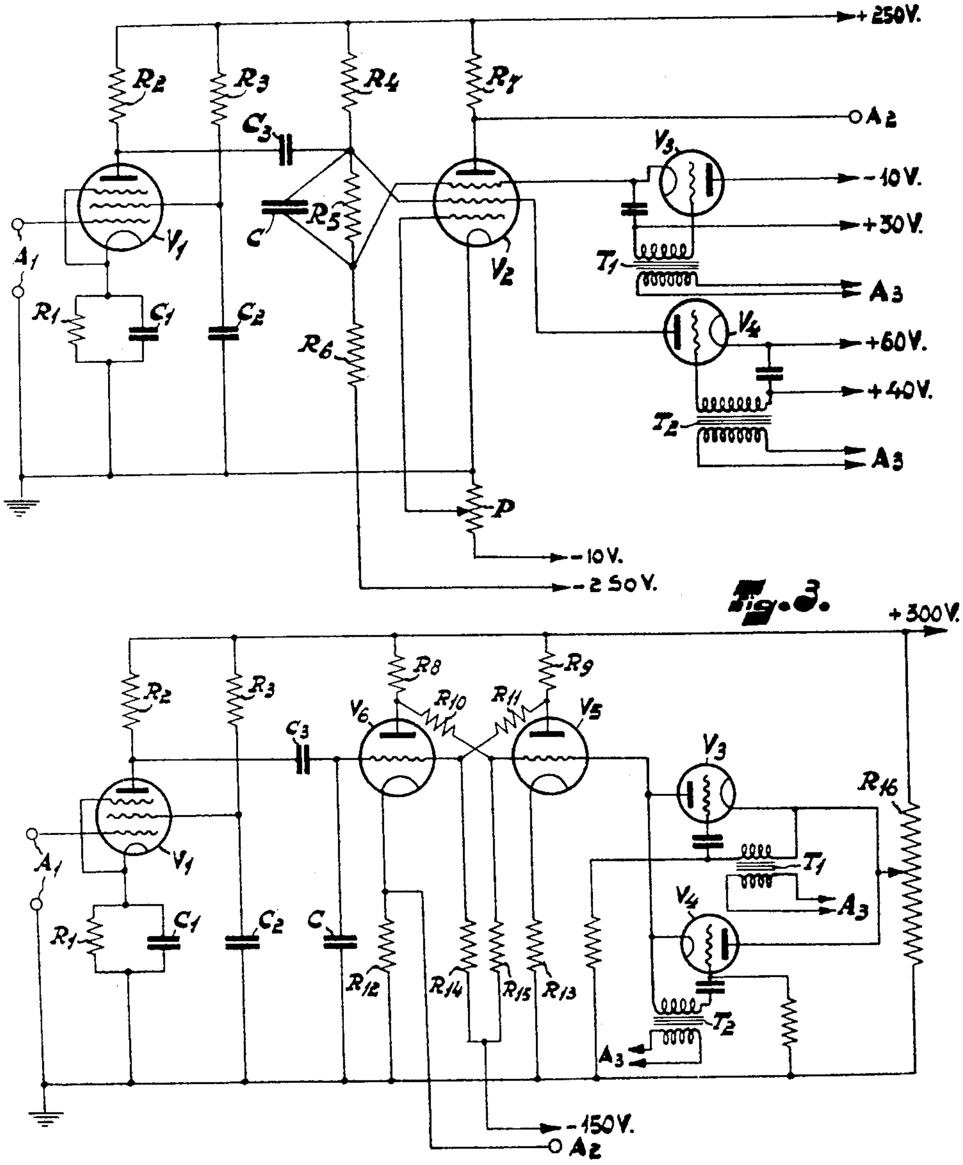
Figure 2 shows a more detailed circuit arrangement according to the invention.
Figure 3 shows a preferred decoding circuit comprising a circuit arrangement according to the invention.

A more detailed circuit arrangement, in principle exactly similar to that shown in Figure 1, is shown in Figure 2. An amplifier comprising a pentode tube $V_1$ having a high anode load resistor $R_2$, is so arranged that the output current is substantially proportional to the voltage input supplied to terminals $A_1$. The amplified pulses are supplied to a second pentode tube $V_2$ arranged in a known transitron circuit so as to develop apparent negative conductance between the screen and suppressor grids over the appropriate range of voltages. Tube $V_2$ preferably has a steep $Ia/Vg$ characteristic curve. The negative conductance may be adjusted by the potential applied to the first grid from the potentiometer P and overrides the positive conductance produced by resistors $R_2$ and $R_6$ and the anode load impedance of tube $V_1$. The shunt capacitance is provided by a capacitor C. The output from this circuit may be taken from terminal $A_2$, as is shown in Figure 2, or it may be taken from across the capacitor C, as shown in Fig. 1. Preferably, however, the output is taken from the anode of tube $V_2$, the use of an independent electrode minimizing back-coupling from the output circuit. Thus, the amplified code pulses are impressed on the transitron circuit whose response to a Heaviside input waveform is a positive exponential.

The initial conditions are established and are re-established at the end of each train of digits constituting a code element by triode clamping tubes $V_3$ and $V_4$, one being connected in one sense to one electrode of capacitor C and the other being connected in the opposite sense to the other electrode of capacitor C, which tubes are normally non-conductive by virtue of negative grid bias and made conductive by pulses supplied by way of terminals $A_3$ to the primary windings of pulse transformers $T_1$ and $T_2$, which pulses are supplied at the end of each code element. It is not necessary to re-establish the initial conditions immediately after the end of the train of digits. Any given delay is so doing will merely result in the multiplication of the output level by a corresponding fixed factor. In any given communication system, a compromise must be struck between this desirable result and the excessive bandwidth consequent upon representing a code element by a train of unduly short pulses followed by an unduly long time-delay.

An alternative circuit which may be used is the distable multivibrator known as the Eccles-Jordan circuit, but modified to contain a single integrating time-constant.

This modified Eccles-Jordan circuit is included in the preferred decoding circuit arrangement which is shown in Fig. 3. An amplifier, which is similar to that described with reference to Fig. 1, comprising a pentode tube $V_1$ having a high anode load resistor $R_2$, is so arranged that the output current is substantially proportional to the voltage input supplied to terminals $A_1$. The amplified pulses are applied to the distable multivibrator which contains a single integrating time-constant circuit arranged so as to develop apparent negative conductance therein over a given range of voltages. This multivibrator has two stable states with either tube $V_5$ or $V_6$ cut off. If when the triode clamp is closed, i. e. when both tubes $V_3$ and $V_4$ are conductive, tube $V_5$ is clamped hard on or hard off, no change in state will occur when the triode clamp is re-opened. Over a small range of voltage, between 9 and 15 volts, both multivibrator tubes will pass current when the clamp is closed. On re-opening the clamp, the circuits return to one or the other stable states, depending on which of the tubes $V_5$ and $V_6$ is taking more current at the time of re-opening.

If the clamp were to be closed and re-opened at say 50 cycles per sec., then an output waveform of 50 cycles per sec. is obtained on the cathode of tube $V_6$. In the absence of the capacitor C this output is a square wave, but the inclusion of the capacitor C causes the rise and fall of the square wave to develop a positive exponential curvature.

Figure 5:
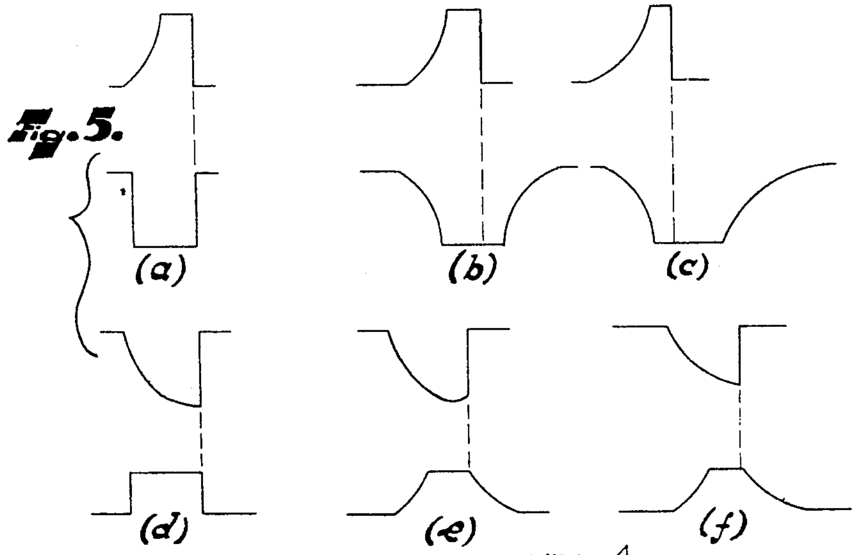
Figures 5 to 8 are waveform diagrams with reference to which the operation of the circuit arrangement of Figures 1 to 4 will hereinafter be explained.

Input and output waveforms illustrating the behaviour of the Eccles-Jordan circuit comprising the capacitor C are shown in Figure 5 in which the following conditions obtain:

Figure 5*a*, *f* 50 c./s., C. 0 v. 14 v.,
Figure 5*b*, *f* 50 c./s., C. 0.002/$\mu$f. v. 14 v.,
Figure 5*c*, *f* 50 c./s., C. 0.006/$\mu$f. v. 14 v.,
Figure 5*d*, *f* 50 c./s., C. 0 v. 9 v.,
Figure 5*e*, *f* 50 c./s., C. 0.002/$\mu$f. v. 9 v.,
Figure 5*f*, *f* 50 c./s., C. 0.006/$\mu$f. v. 9 v., where

*f* is the frequency at which the clamp is closed and re-opened,
C is the value of capacitor C, and
*v* is the voltage at the tapping on potentiometer $R_{16}$.

It will be seen that the input waveform taken at the grid of the tube $V_5$ is also affected to a certain extent by variations in the circuit constants.

The following values are given as examples of components suitable for use in the circuit arrangements of Figures 2 and 3; it will be noted that some of the references are common to the two figures.

| | |
|---|---|
| $R_1$=2.2K ohms | $R_{10}=10^6$ ohms |
| $R_2$=220K ohms | $R_{11}=10^6$ ohms |
| $R_3$=470K ohms | $R_{12}$=22K ohms |
| $R_4$=47K ohms | $R_{13}$=22K ohms |
| $R_5$=100K ohms | $R_{14}=10^6$ ohms |
| $R_6$=220K ohms | $R_{15}=10^6$ ohms |
| $R_7$=10K ohms | $C_1$=0.1/$\mu$f. |
| $R_8$=100K ohms | $C_2$=0.1/$\mu$f. |
| $R_9$=100K ohms | $C_3$=100/$\mu$/$\mu$f. |

Figure 4:
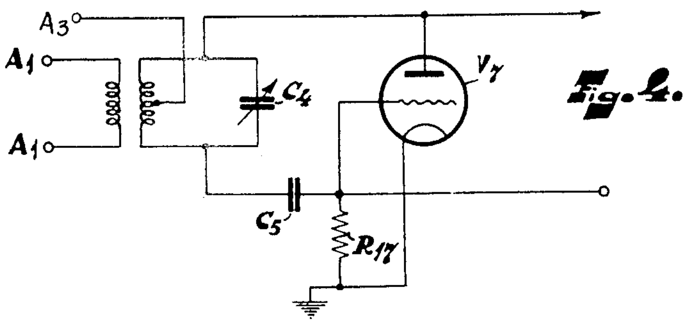
Figure 4 shows a circuit arrangement according to the invention comprising a super-regenerative amplifier.
Figure 6:
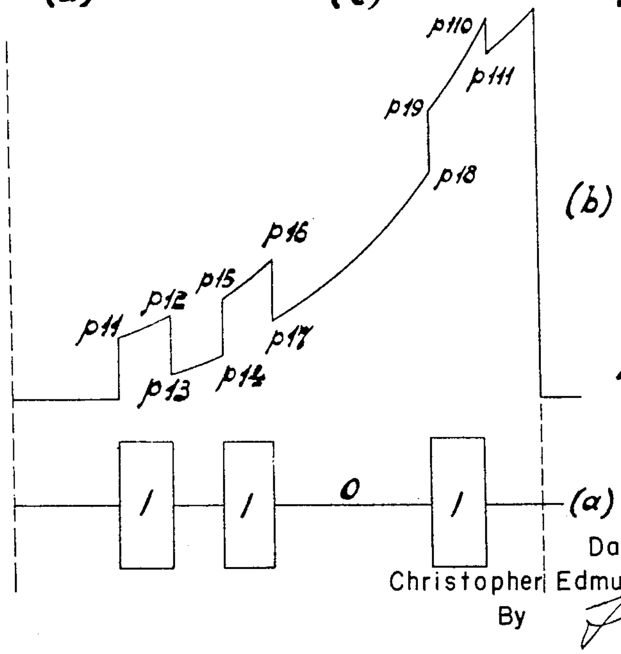

Figure 4 shows a circuit arrangement in which a tube $V_7$ is connected as a super-regenerative amplifier in a known manner. As an example, capacitors $C_4$ and $C_5$ may be 100 $\mu\mu$f. and registor $R_{17}$ may be 3 megohms. Input radio frequency oscillations modulated by square-topped-pulses and representing, for example, a binary code signal 1101, are applied to the input terminal $A_1$ and are shown in Figure 6*a*. The oscillator, which includes the capacitor $C_4$ and the secondary of transformer $T_3$, commences oscillating at a time corresponding to the point $P_{11}$ of Figures 6*a* and 6*b* and upon the exponentially increasing envelope of the amplified oscillations are superimposed the code pulses applied by way of the transformer $T_3$ as is shown in Figure 6. The Heaviside units of the levels at the various points are as follows:

| | |
|---|---|
| $P_{11}$ $1+\sqrt{2}$ | $P_{17}$ 3 |
| $P_{12}$ $2+\sqrt{2}$ | $P_{18}$ $6\sqrt{2}$ |
| $P_{13}$ 1 | $P_{19}$ $1+7\sqrt{2}$ |
| $P_{14}$ $\sqrt{2}$ | $P_{110}$ $14+\sqrt{2}$ |
| $P_{15}$ $1+2\sqrt{2}$ | $P_{111}$ (end point) 13 |
| $P_{16}$ $4+\sqrt{2}$ | |

Thus the equivalence 1101(binary)=13 (decimal) is performed, the effect of the leading edge of each code pulse being to increase and that of the trailing edge to decrease the level by $1+\sqrt{2}$, the exponential increasing by a factor of 2 for each mark and space time $\tau$ of the code pulses, and the code pulses being of length $\tau/2$. The super-regenerative amplifier is quenched at the end of each code element by a timed quench voltage introduced by way of terminal $A_3$ in to the anode circuit of tube $V_7$. The output is taken from terminal $A_2$ in the form of a rectified envelope.

The circuit arrangements of Figure 1, 2 and 3 operate effectively in a similar manner, the exponential wave form being derived from a charging capacitor C. Numerical values in performing, say, the equivalence 1101=13 are exactly similar to those given above in relation to Figure 6*a* which was used to explain the operation of the circuit shown in Fig. 4.

Figure 7:
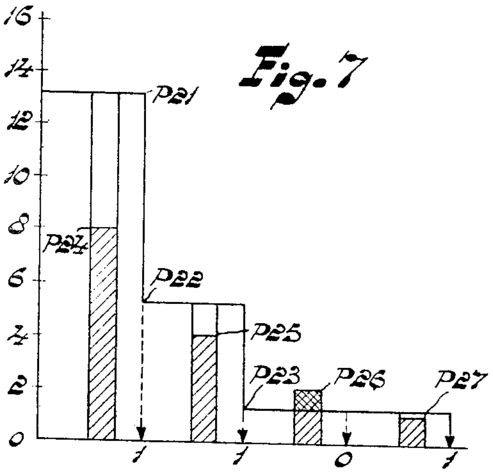

A known simple encoder suitable for the "1101=13" code operates in the manner now to be described with reference to the graph shown at Figure 7.

The signal level is first compared with a level equal to half the transmissible peak; if the signal level is greater a pulse is sent and the comparison level is subtracted from the signal level. If it is less, no signal is sent and the comparison is not subtracted. The resultant level is once again compared with a standard half the height of the first; this process is repeated until the resultant level is less than one quantum. To illustrate Figure 7 the level $P_{21}=13.2$ units is taken, whereupon:

| | |
|---|---|
| $P_{22}=5.2$ | $P_{25}=4$ |
| $P_{23}=1.2$ | $P_{26}=2$ |
| $P_{24}=8$ | $P_{27}=1$ |

Figure 8:
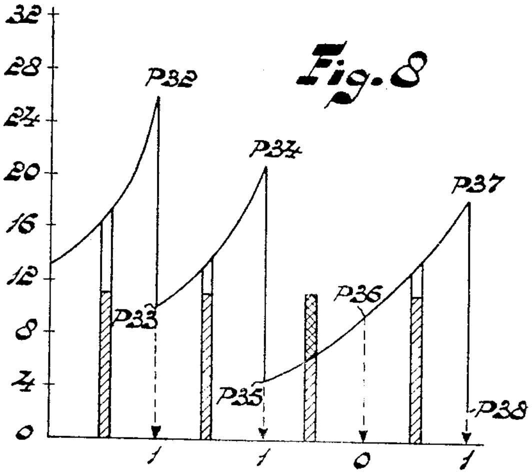

A positive exponential circuit may have advantage in this form of encoder also as may be seen from a study of the graph shown in Figure 8. Here the comparison levels are constant and so are the amounts which are subtracted from the signal; the latter, however, is allowed to rise exponentially. As an illustration the following values are given:

| | |
|---|---|
| $P_{31}=13.2$ | $P_{35}=4.8$ |
| $P_{32}=26.4$ | $P_{36}=9.6$ |
| $P_{33}=10.4$ | $P_{37}=19.2$ |
| $P_{34}=20.8$ | $P_{38}=3.2$ |

The comparison signal is here assumed to be equally spaced between the moments of emitting the code pulses and to be of level $8\sqrt{2}$.

Figures 9, 10:
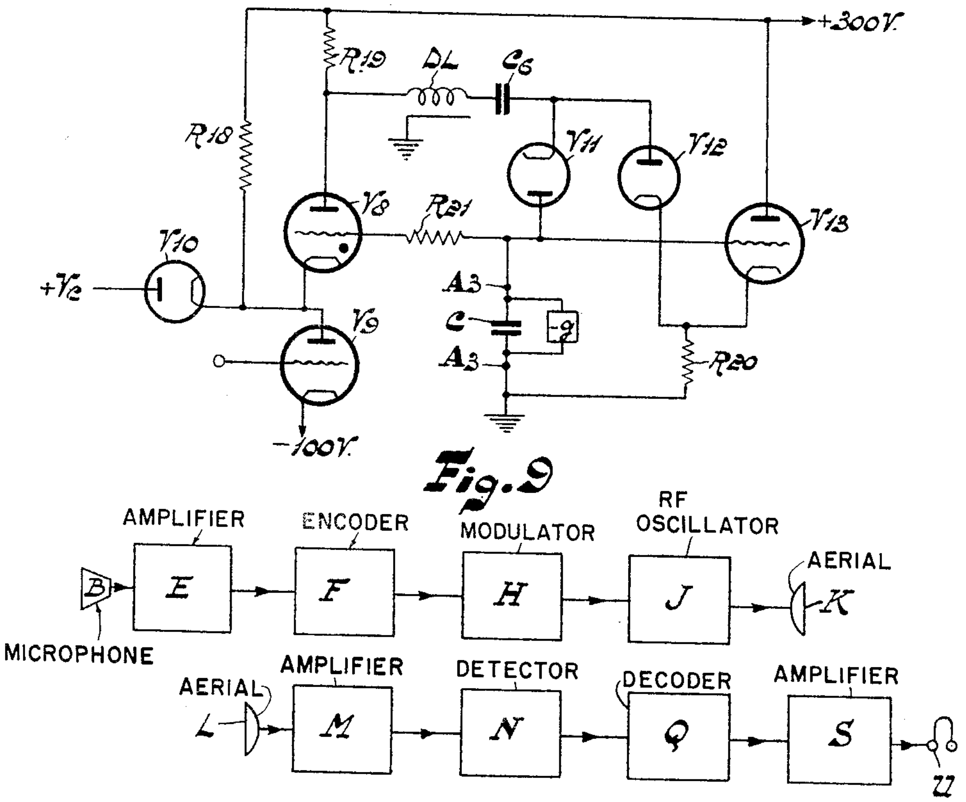
Figure 9 shows an encoder circuit comprising a circuit arrangement according to the invention.
Figure 10 shows a pulse code modulation system comprising a transmitter having an encoder incorporating a circuit arrangement according to the invention and a receiver having a decoder incorporating a circuit arrangement according to the invention.

A simple encoder circuit in which comparison and subtraction are performed in one operation is shown in Figure 9 and comprises a grid-controlled gas-filled discharge tube. Capacitor C corresponds to the capacitor C in Figure 2 and it is assumed that the remainder of the circuit of Figure 2 which has been described above forming the negative conductance $-g$ and capacitance represented by capacitor C is connected across its terminals $A_3$. The cathode of the grid-controlled gas-filled tube $V_8$ is connected to the anode of a hard triode tube $V_9$. Tube $V_9$ is normally cut off by the voltage at its grid and its anode potential applied by way of resistor $R_{18}$ is 300 volts. The anode and cathode of tube $V_8$ are thus at the same potential and tube $V_8$ does not conduct. Periodically, at times corresponding to the points $P_{32}$, $P_{34}$, etc. (Figure 8) positive pulses are applied to the grid of tube $V_9$. Consequently, the cathode voltage of tube $V_8$ falls until it is clamped by the diode $V_{10}$ at a voltage $+V_c$ such that the critical discharge grid-voltage of tube $V_8$ is equal to the required comparison voltage. If the voltage across the capacitor C is less than the comparison voltage, tube $V_8$ does not conduct, if it is greater than the comparison voltage, tube $V_8$ conducts and a negative-going pulse of definite magnitude and length appears across the anode resistor $R_{19}$. A pulse so produced travels down a delay line DL and by way of a capacitor $C_6$ and a diode $V_{11}$ puts a negative charge on capacitor C. The pulse voltage is many times greater than any value of the normal voltage across capacitor C, so that this negative charge and the consequent reduction in voltage are approximately independent of the initial normal voltage across capacitor C. Summarised, the action of the tubes $V_8$, $V_9$ and $V_{10}$ and their associated components, described above, is to reduce the voltage across capacitor C by a predetermined amount when and only when the voltage across capacitor C exceeds a predetermined comparison voltage at one of a series of predetermined instants.

Initial conditions are restored when the pulse is completed with the use of tubes $V_{12}$ and $V_{13}$. The positive charge at the end of each pulse passes through the diode $V_{12}$ and a resistor $R_{20}$. Tube $V_{13}$ is connected as a cathode follower which maintains the potential of the cathode of tube $V_{12}$ approximately at that of the anode of tube $V_{11}$ and hence ensures that tube $V_{12}$ conducts without appreciable voltage threshold when each pulse is completed. Resistor $R_{21}$ is of sufficient magnitude to ensure that the grid voltage of tube $V_8$ when conducting, does not appreciably influence the charge of capacitor C.

Figure 10 is a block schematic diagram of a complete pulse code modulation system in which the transmitter and receiver each comprise a circuit-arrangement according to the invention. The transmitter comprises a microphone B, an amplifier E, an encoder F, for example, of the type illustrated in Fig. 9 in accordance with this invention, a modulator H, a radio frequency oscillator J and a transmitting aerial array K. The receiver comprises a receiving aerial array L, a radio frequency and intermediate frequency amplifier M, a detector N, a decoder Q, for example, of the type illustrated in Fig. 3 in accordance with this invention, an audio-frequency amplifier S and output means U.

What we claim is:

1. A pulse code communication system comprising a transmitter including encoding apparatus for a modulation signal and provided with means to produce in response to an input voltage representative of a value of said signal, an output voltage varying exponentially as a function of time and having an initial level depending on said input voltage; and a receiver for intercepting pulse code signals emitted by said transmitter and including decoding apparatus provided with means responsive to said pulse code signals to produce an output voltage varying exponentially as a function of time and having a final level depending on said pulse code signals.

2. A system, as set forth in claim 1, wherein said encoding apparatus includes a negative conductance device, a reactive conductance member coupled to said device, means to apply said input voltage to said device, and means to derive said output voltage from said member.

3. A system, as set forth in claim 2, wherein said decoding apparatus includes a negative conductance device, a reactive conductance member coupled thereto, means to apply said pulse code signals to said device and means to derive said output voltage from said member.

4. In a pulse code transmitter, encoding apparatus comprising a negative conductance device, a reactive conductance device coupled thereto, means to apply an input voltage representative of the instantaneous value of a modulating signal to said device, and means to derive from said member an output signal varying exponentially as a function of time and having an initial value depending on said input voltage.

5. Encoding apparatus, as set forth in claim 4, wherein said device and said member are coupled in shunt relation.

6. Encoding apparatus, as set forth in claim 4, wherein said device is constituted by a transitron circuit.

7. Encoding apparatus, as set forth in claim 4, comprising a distable multivibrator containing a single integrating time-constant circuit.

8. Encoding apparatus, as set forth in claim 4, further including means to compare the output signal with a comparison level and means to subtract the comparison level from the output signal if the magnitude of the comparison level is less than the magnitude of the signal to be encoded.

References Cited in the file of this patent

UNITED STATES PATENTS

| | | |
|---|---|---|
| 2,449,467 | Goodall | Sept. 14, 1948 |
| 2,451,044 | Pierce | Oct. 12, 1948 |
| 2,501,186 | Okrent | Mar. 21, 1950 |
| 2,521,733 | Lesti | Sept. 12, 1950 |
| 2,531,846 | Goodall | Nov. 28, 1950 |
| 2,538,266 | Pierce | Jan. 16, 1951 |